Figure 1:
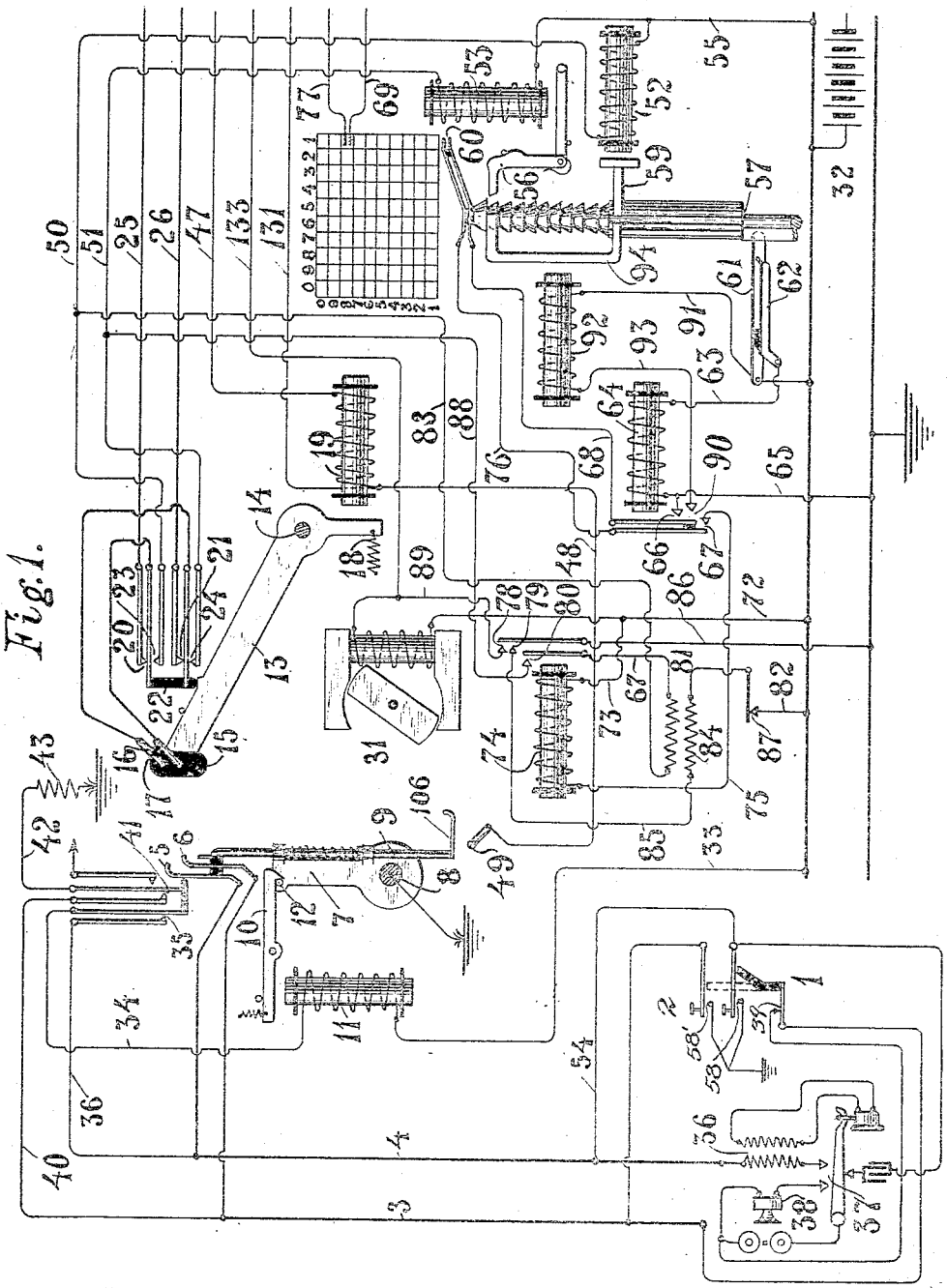

F. G. AGRELL.
ELECTROMECHANICAL EXCHANGE SYSTEM.
APPLICATION FILED AUG. 23, 1907.

1,167,872.

Patented Jan. 11, 1916.
10 SHEETS—SHEET 6.

Witnesses:
B. W. Couldock
J. Edward Golden

Frans Gunnar Agrell, Inventor
By his Attorney Lewis J. Doolittle

F. G. AGRELL.
ELECTROMECHANICAL EXCHANGE SYSTEM.
APPLICATION FILED AUG. 23, 1907.

1,167,872.

Patented Jan. 11, 1916.
10 SHEETS—SHEET 7.

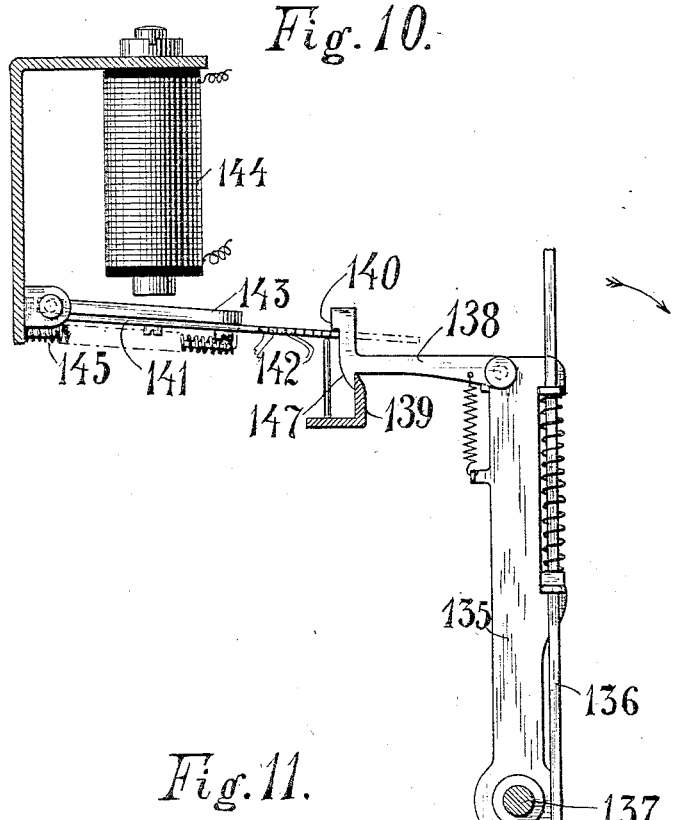
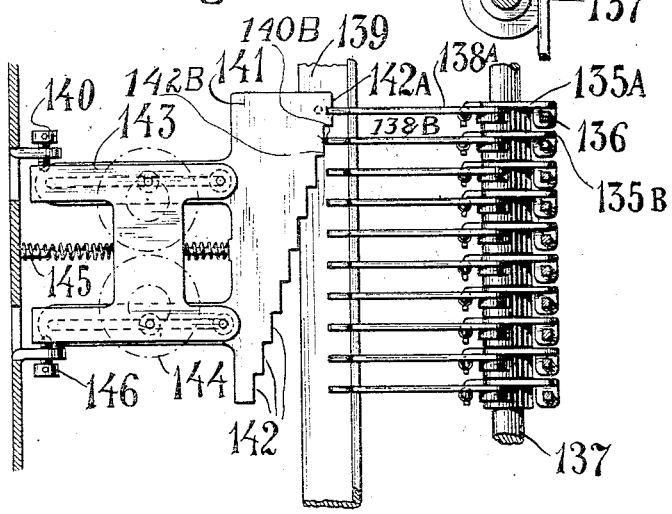

UNITED STATES PATENT OFFICE.

FRANS GUNNAR AGRELL, OF STOCKHOLM, SWEDEN.

ELECTROMECHANICAL EXCHANGE SYSTEM.

1,167,872. Specification of Letters Patent. Patented Jan. 11, 1916.

Application filed August 23, 1907. Serial No. 389,855.

*To all whom it may concern:*

Be it known that I, FRANS GUNNAR AGRELL, a subject of the King of Sweden, and a resident of Stockholm, Sweden, have invented certain new and useful Improvements in Electromechanical Exchange Systems, of which the following is a specification.

This invention relates to electro-mechanical exchange systems of that class which usually are called automatic exchange systems, in which connections are established between any two of a number of electrical circuits by the party desiring said connection without the assistance of another party (the operator). Systems of this class are sometimes employed for establishing the connections between several subscribers in a telephone system but may of course be used for establishing connections between any kinds of circuits. The systems heretofore devised can be divided into two different classes; one (which is now most in use) where every subscriber has a selective switch at the central station by means of which he can establish a connection with a number of other subscribers or selective switches selectively. In this case the selective switches must comprise a switching device adapted to make connections between the line to which said selective switch belongs and a number of other circuits and selective means for directing the movement of the switch so as to make contact with the desired circuit. The other large class of automatic systems is characterized by the absence of selective switches individual to each circuit and their substitution by suitable means for connecting any circuit with a switching circuit which then by means of a selector switch or a connecting device controlled by a selecting device completes the connection. A system of this last named class used the same principles as a manually operated system and is therefore similar to such a system to a certain degree. The switching circuits of the automatic system correspond to the cord circuits of the manually operated systems, the connecting device that connects at first the calling subscriber to said switching circuit and then the other end of said switching circuit with the subscriber to be called correspond to the plugs and jacks and the operator's hands and the selecting device that registers the impulses sent by the calling subscriber and utilizes them for directing the movement of the connecting device so as to make connection with the subscriber to be called corresponds to the brain and nerves of the operator. Such a system can, therefore, be devised in such a way that the utmost economy is used with regard to the expensive parts which necessarily are the selective means. This economy is obtained by utilizing the selective means for establishing connections for a plurality of circuits in succession. The function of the connecting devices will now be purely automatic (not selective), that is, their action is, after having been started, independent of the will of the subscriber and is predetermined by the action of the selecting device.

The system which will be herein described belongs to the last named class.

The object of the invention is to provide a system of devices and connections by means of which the principles set forth may be employed with advantage in telephone exchanges having any desirable number of subscribers. In systems of this class heretofore devised the number of subscribers that can be accommodated automatically has either been very much limited or, if a greater number of subscribers has to be accommodated, the principles set forth have not been thoroughly utilized. In addition to this the devices used for the establishing of the connections have been very complicated so that in spite of the obvious advantages of such a system as compared with the first mentioned system, that system is still almost exclusively in use.

Figure 2:
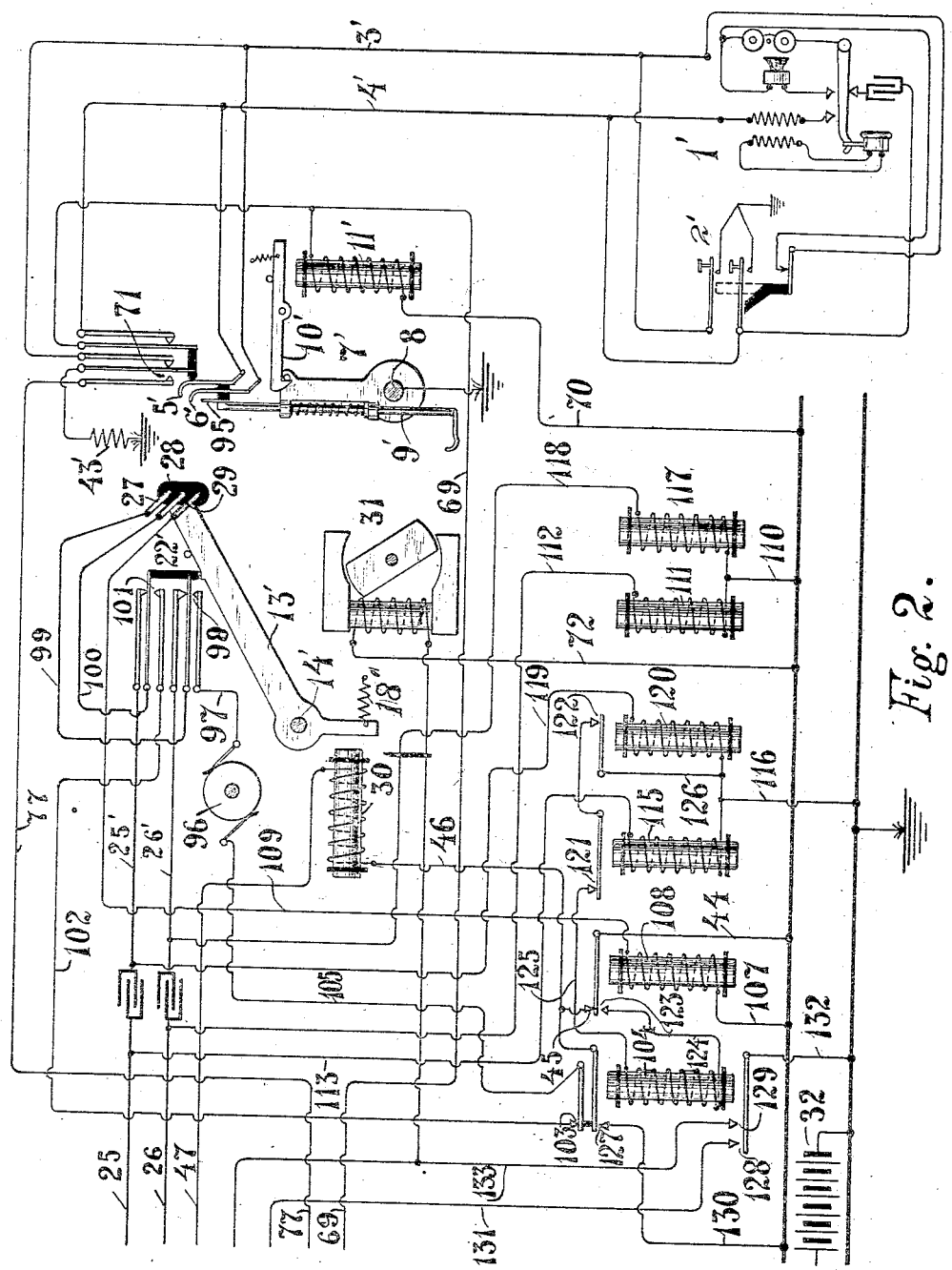
Figure 3:
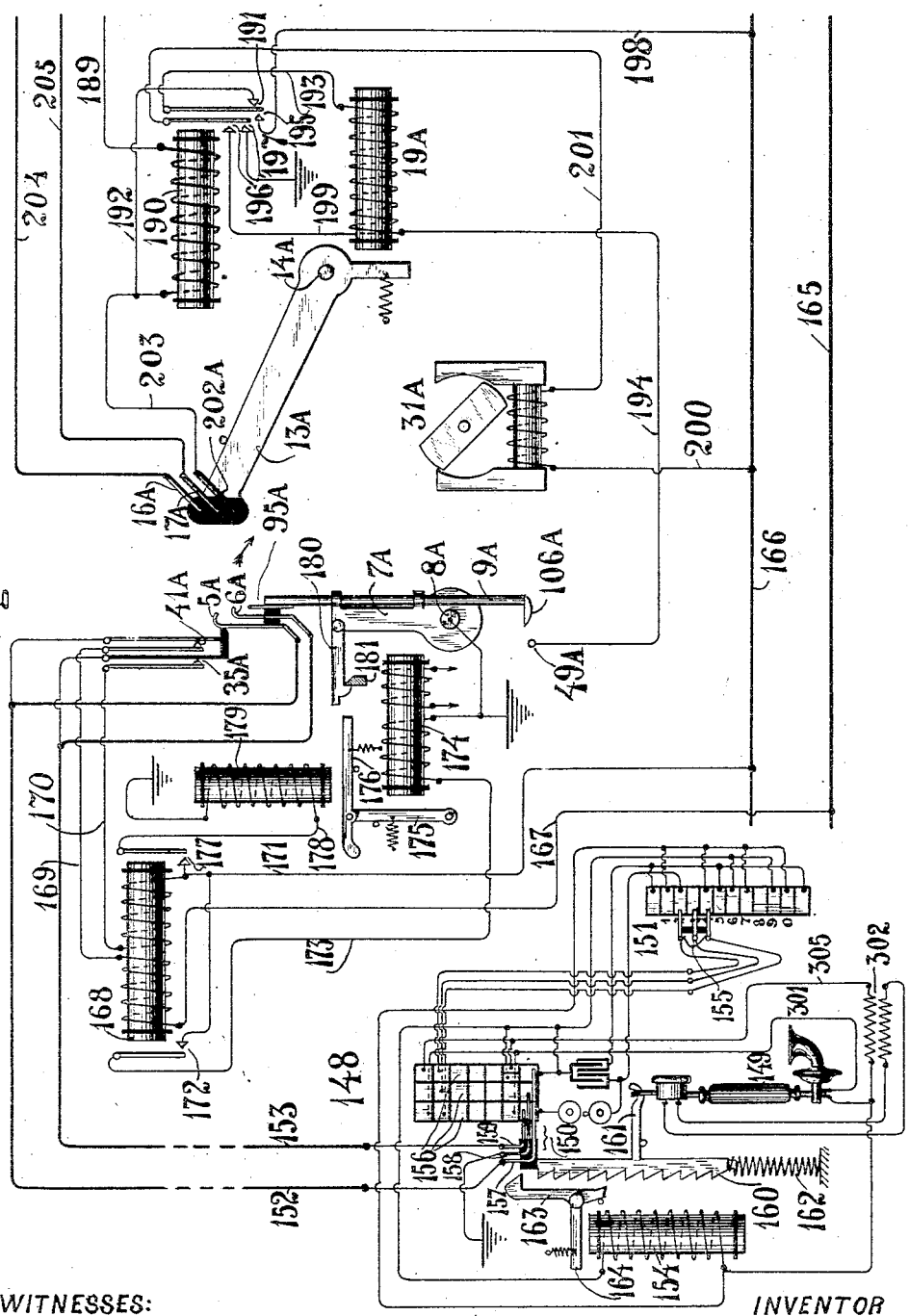
Figure 4:
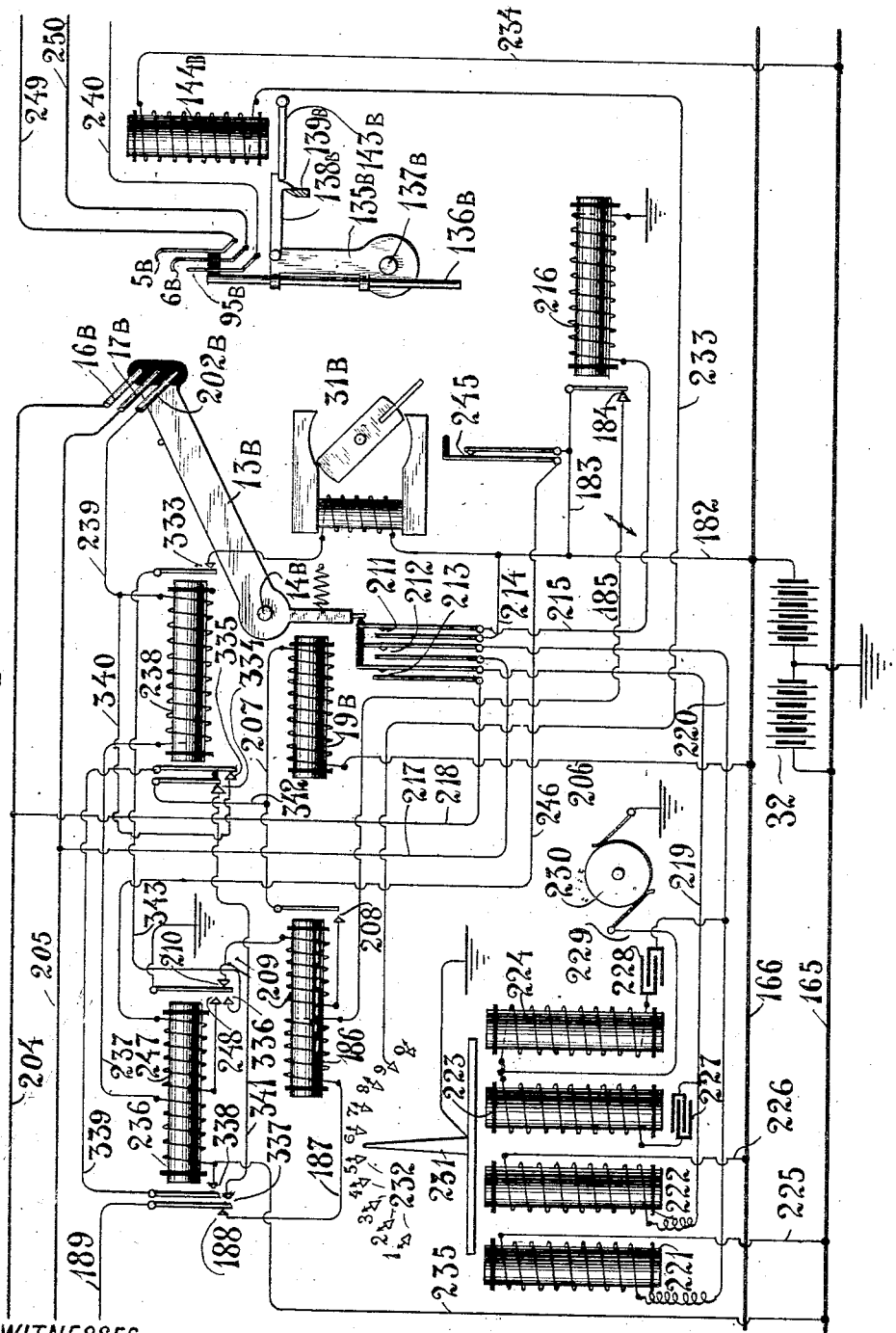
Figure 5:
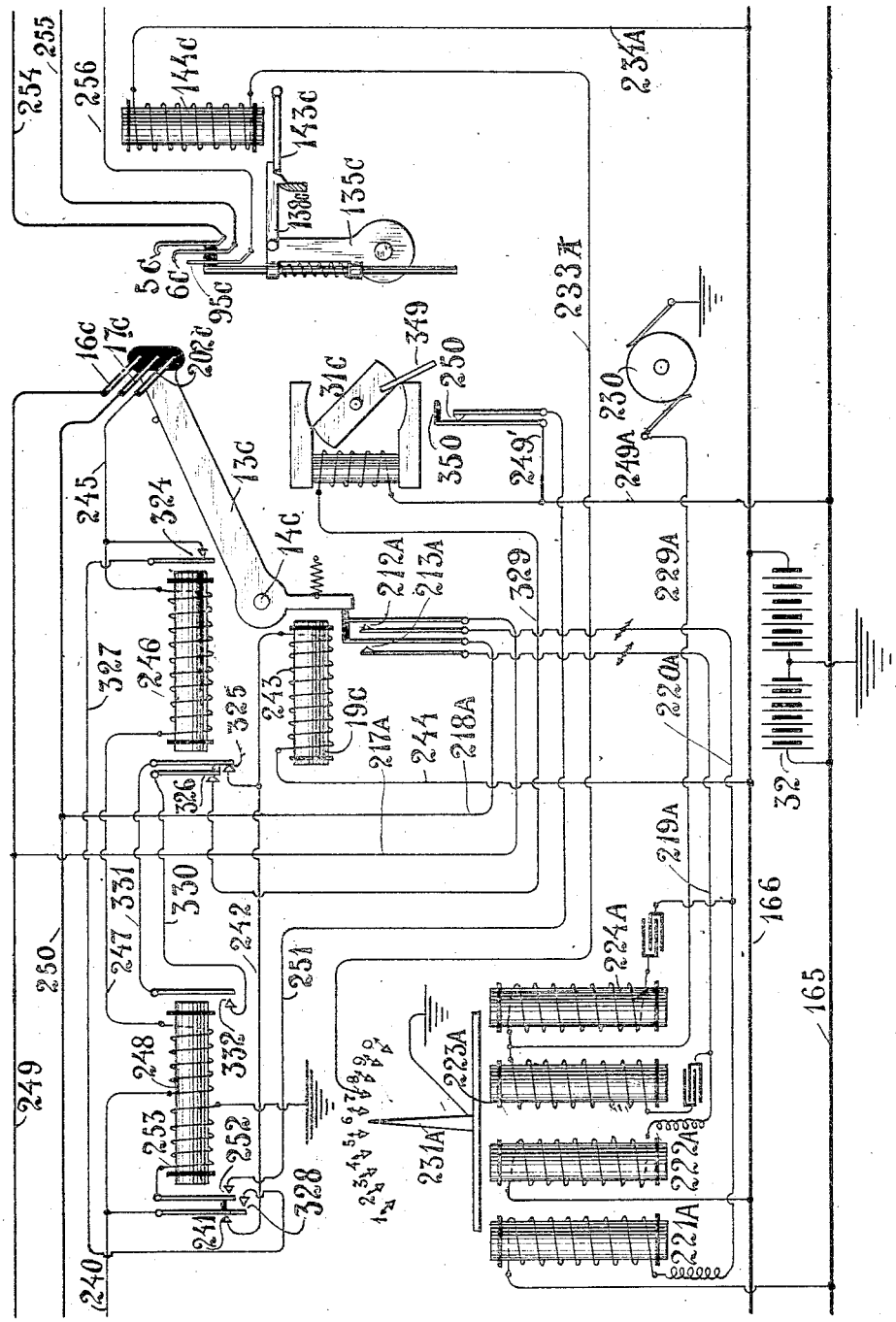
Figure 6:
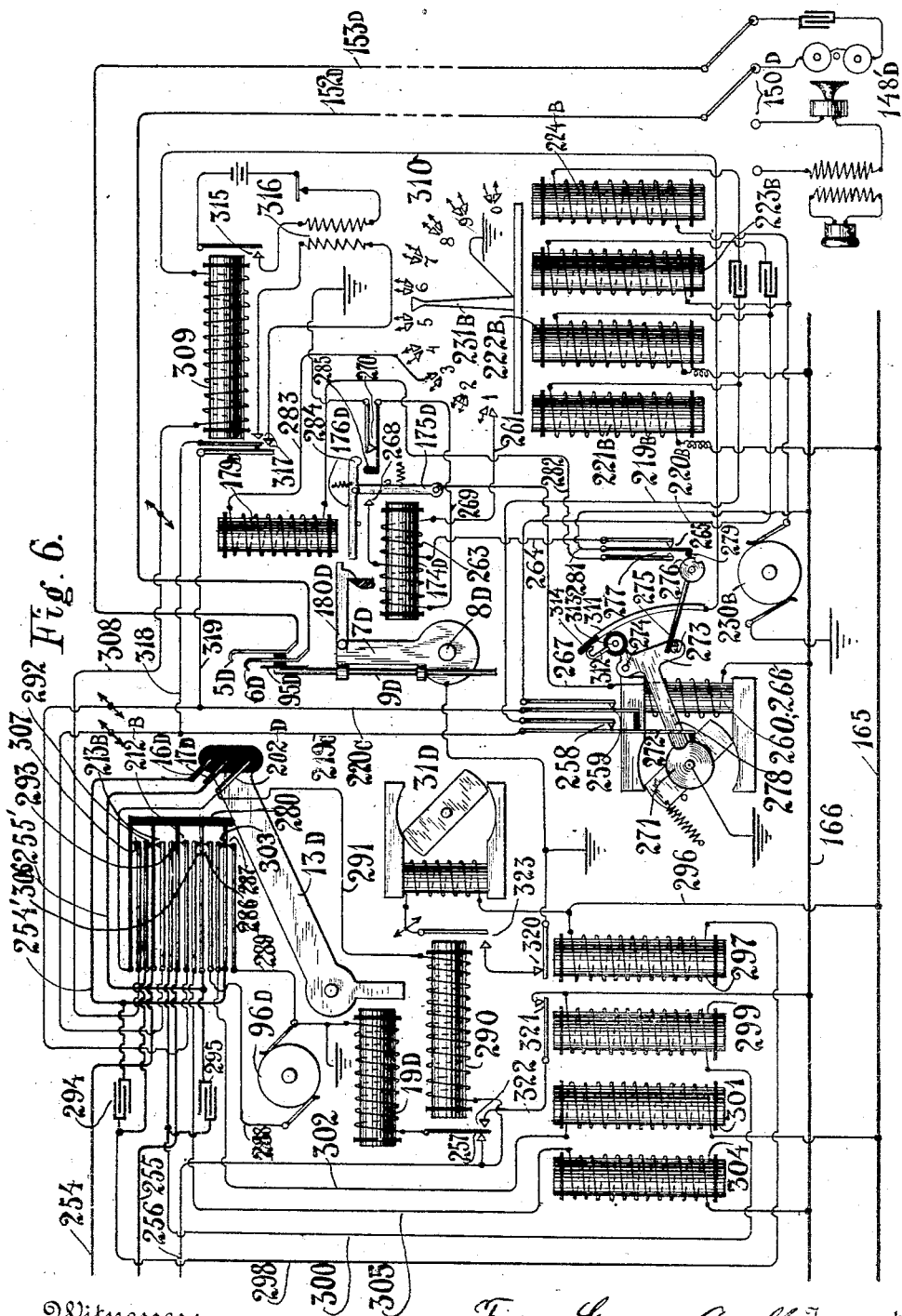
Figure 7:
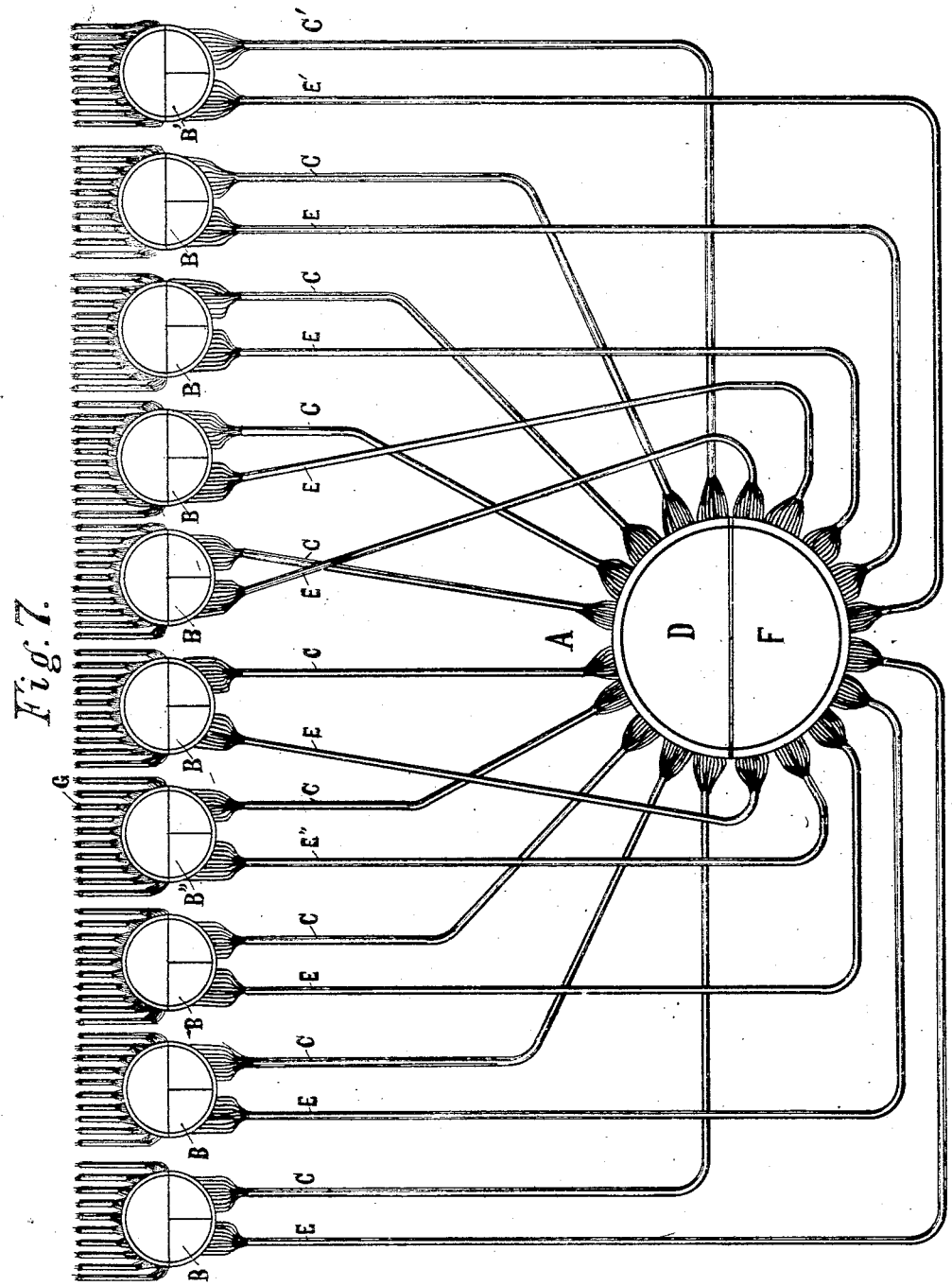
Figure 8:
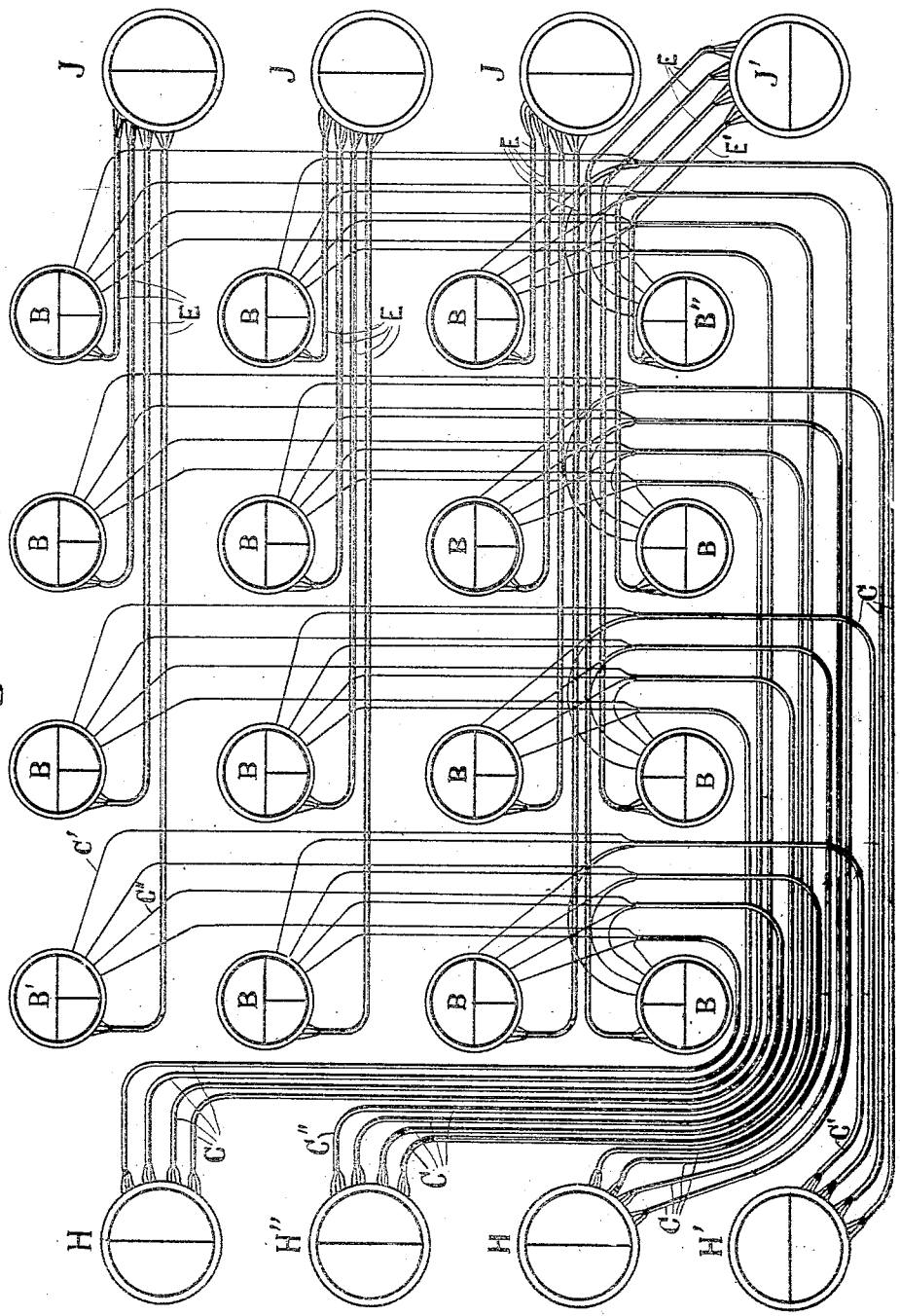
Figure 9:
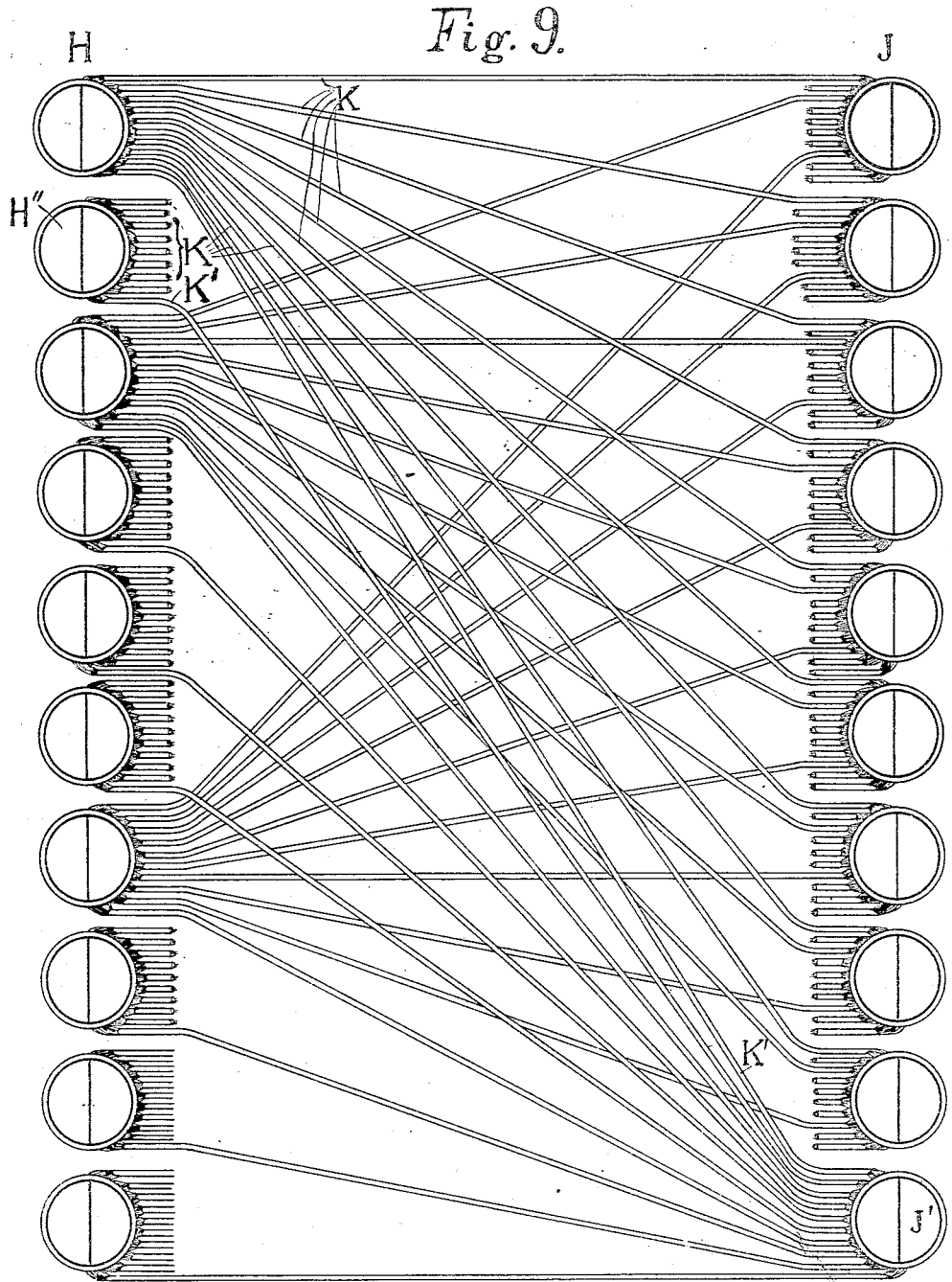

In the accompanying drawings, Figures 1 and 2 are a diagram, showing the connections of an automatic exchange for one hundred subscribers using a known selective system. Figs. 3, 4 and 6 are diagrams which together show a system having one thousand subscribers. Fig. 5 shows additional connections which together with Figs. 3, 4 and 6 make up a system of ten thousand subscribers. Fig. 7 shows the cabling of the talking circuits of an exchange of one thousand subscribers. Figs. 8 and 9 show the cabling of the talking circuits of an exchange of ten thousand subscribers and Fig. 10 is an elevation of a release arrangement of the trunk connectors and Fig. 11 is a plan view seen from the top of said device.

The devices utilized in my system are subject to separate applications and will, therefore, be only briefly described herein. Some of these devices may also be substituted by old devices that fulfil the requirements of the system as the construction of all the devices is to a certain degree non-essential for the operation of said system.

Before describing the system in detail I will briefly out-line its operation and that of the necessary devices so as to show the relation of said devices to the system.

*Brief description of system.*—A suitable number of subscribers for instance 100 are connected to the terminals of a switching device which herein will be designated as "primary connector" and which may or may not be the same device as that which later will be termed the "ten and unit connector." The office of the primary connector is to connect the calling subscriber to an incoming switching circuit which at the time is idle. The number of the switching circuits connected to said connector shall be so selected as to correspond to what is termed the maximum load of the exchange, that means, shall be equal or slightly higher than the number of simultaneous calls that may be expected to be the maximum among the subscribers of said primary connector. This maximum load is usually assumed to be less than ten per cent. of the number of subscribers but varies of course in different exchanges. After the said connection is performed the switching circuit will connect itself to a selector which selector will receive the impulses so as to connect that switching circuit either directly to the subscriber to be called or, in the case of there being more subscribers in the exchange than can be accommodated by one connector, to a switching circuit that leads to the connector to which the desired subscriber is connected. This operation being performed the selector disconnects itself so that it can be used for the next call and a new selector is connected in to the switching circuit at the connector of the desired subscriber. This selector now selects the desired subscriber at the ten and unit connector which then makes the connection between said subscriber and that switching circuit to which the calling subscriber has been connected.

As will be seen from the above description a number of subscribers use the same connector. To prevent interference between simultaneously calling subscribers the connector must therefore be provided with a consecutive arrangement which provides for a time interval between the action of the calls.

The connection between the switching circuits in the case of there being more than a hundred subscribers is performed by secondary connectors and the numbers of these connectors depend upon the number of switching circuits, one secondary connector may facilitate the connections between a hundred incoming and a hundred out-going switching circuits. The connection between the switching circuits is performed step for step, one step for each digit of the subscriber's number so that, if the exchange, for instance, has between one thousand and ten thousand subscribers, the connection is performed by means of two secondary connectors, one thousand connector and one hundred connector. With only a hundred subscribers in the exchange no secondary connector is needed, with thousand subscribers one secondary connector is used. An important feature of my invention is now that by inserting a connector for each additional digit of the subscriber's number any desired number of subscribers can be accommodated by the same exchange and another feature is that these connectors need not be placed in the same locality. It is therefore possible to divide a territory into a number of small subexchanges, let us say of one hundred subscribers each, and have the connections between the switching circuits performed by a central or master exchange to which only the trunk lines from said sub-exchanges enter. These master exchanges may also be divided into groups and the connections between the switching circuits or trunks of said master exchanges may be performed at a head exchange and this method can be repeated as many times as may be desired so that all the subscribers of a very large territory may be able to establish connections with any other subscriber in said territory without the assistance of any operator. With this method a very great saving in lines is also accomplished as the sub-exchanges may be established at a very short distance from the subscriber's stations and accordingly direct lines are only used for the shortest possible distances, all longer distances being covered by trunk lines to a number that may be approximately valued at ten per cent. of the number of subscribers. This idea is believed to be broadly new and opens new fields for the telephone on account of the reduced cost.

The devices necessary for operating the system are in addition to the subscriber's instruments and the relays, retardation coils, generators, and batteries ordinarily used in a common battery exchange the following: automatically operated switching devices herein termed connectors for making connections between subscriber's lines and trunk lines and between trunk lines, senders at the subscriber's instruments adapted to send the impulses required for selection, selectors adapted to respond to the action of the senders and direct the operation of the connectors.

*The connector.*—Switching devices adapted to be used in the automatic system are illustrated diagrammatically. It is not thought necessary to explain more than the most important features of the connectors in this specification.

The connectors used for connecting the subscriber's line to a trunk line, have three groups of connecting members so arranged that any member of one group can make contact with any member of another group. One of these last named groups is used for incoming calls, the other group for outgoing calls. These two groups are therefore connected to trunk lines, the third group to subscriber's lines. Arrangements are provided by means of which the terminal of the calling subscriber is automatically (not selectively) connected to an idle trunk line and arrangements may be provided to prevent the calling member from being connected to a trunk line which leads to a trunk connector which at the time is busy establishing a connection. Consecutive arrangements are provided so as to prevent interference between simultaneously calling members. When an outgoing call is to be served over a trunk line this trunk line connects itself temporarily with the selector controlling the operation of the connector. This selector selects the terminal of the desired subscriber and causes the same to make connection with the terminals of said trunk line and when this is done the selector is disconnected from said trunk line so that it can be used by any other trunk that thereafter is used. Restoring means common to a number of connecting members, preferably one for each connecting device, is used for restoring the connecting members to their initial position after the call is finished. Arrangements are also provided by means of which this common restoring means is prevented from restoring any terminals under the duration of the call.

The connectors used for making connections between trunk lines differ only slightly in construction from the before mentioned connectors. Only two groups of connecting members are used and the number of connecting members in both groups is equal. One of these groups is equivalent to the first group of terminals at the local connector and is connected to the second group of terminals of said connector or to the terminals of the second group of a preceding trunk connector. The second group of the trunk connector is somewhat similar to the third group of terminals of the local connector that is, its action is independent of the first group of terminals. Said second group is divided into sections of which each section corresponds to a number in that digit to which the trunk connector belongs. The several terminals of each of said sections are released by means of the action of a selector selecting that special section and arrangements are provided by means of which the first idle terminal is automatically released. These means are common to the section.

The second group of terminals is connected to the second group of terminals of local connectors, each section to one connector, or are connected to the first group of subsequent trunk connectors each section to a certain connector.

As in the local connector means common to the whole connector are provided for restoring the terminals of one of the groups and might be used for the restoration of the second group. The main feature of the system utilizing these connectors is characterized by the independence of the talking circuits. A talking circuit when completed has no taps or multiple contacts or means that do not participate in the transmission of speech and the construction of the terminals is such that a very good connection is obtained between engaging terminals on account of the comparatively great pressure between the contact surfaces during the connection. The trouble that so frequently arises in automatic telephone systems on account of intermittently broken circuits resulting from the loose contacts of present switching arrangements are thus wholly eliminated. There are on the other hand no shunts of the talking circuit except that necessary for the current supply and as a result the transmission ability of a talking connection in this system is just as good as that of the best constructed and maintained manually operated cord circuits.

*The selective system.*—As has been seen from the brief description of the automatic system set forth the action of the connectors must be directed to a certain extent by the action of selectors. Any suitable system of selectors and senders could be employed in conjunction with the connectors and, as will be seen later, I have shown an automatic system using a step for step selecting system of known type in combination with the means set forth, as an example. For reasons that will be fully stated hereinafter I prefer to use a selective system different from the systems used up to this time. In this a selection of any number in a digit is performed by a single impulse. I here will only state the main features of said system and the selector.

In order to be able to slect any one of a number of contacts (preferably ten, corresponding to the ten numbers in a digit of the decimal system of counting) without using any source of current or complicated or expensive means at the sending stations, I employ several currents superimposed upon each other in circuits composed by the subscriber's line and ground and the impulses are sent merely by making one or more simultaneous connections between the line wires or line wires and ground at said station.

*The selector.*—In my Patent No. 979,404 I have shown a device which operated by one or more of the superimposed currents mentioned will close the one or the other of a number of contacts. Any combination of selecting relays such as those employed for selective type writer telegraph purposes could, of course, be used as a selecting device, but the device above referred to has a great advantage over present constructions inasmuch that said device by means of coöperation between the selective relays causes a contact maker to make the desired contact directly so that the local circuit closed by said selector includes one contact only which of course eliminates a great many chances of trouble.

*The sender.*—As sender for this selective system many widely different devices could be used. The simplest would of course be to provide circuit closing keys at the subscriber's station, each key making the connection that corresponds to a certain number in a digit but as this would tend to make the operation of the automatic exchange too much dependent upon the subscriber's use or misuse of the keys I have designed a special type of sender that after having been set to the number of the subscriber wanted before calling, automatically makes the right connections necessary to select said subscriber in the right succession and without any assistance of the subscriber. This sender has been fully described in my Patent No. 927,469. A telephone system using such a sender is automatic in the broadest sense of the word as the sender as well as the exchange apparatus after having been started works perfectly independent of the subscriber, its action being predetermined by the position to which the subscriber previously to giving the starting impulse has set the sender. The sender consists of two different combinations of switches, the first set which herein will be termed the "indicator switch" adapted to be set by the subscriber in positions corresponding to the different figures in the wanted subscriber's number, which switch makes the connection between terminals adapted to be connected to line and ground, and a second switch arrangement which herein will be termed the "consecutive" switch operating in conjunction with the switch hook t the telephone instrument and adapted to connect the before mentioned terminals to line and ground in proper succession. This switch also makes the connections necessary for starting the exchange apparatus and for connecting and disconnecting the telephone instrument to the line. Its dependence upon the switch hook is limited to the starting impulse and the ending impulse merely, the further action of the switch being dependent upon the exchange apparatus only by means of a detent pawl operated by an electro-magnet energized by the currents sent out from the exchange.

*Consecutive arrangements.*—To prevent interference between different parties wanting to get access to common means consecutive arrangements are provided. Such arrangements have been described in my Patent No. 973,737 and it has not been thought necessary to describe these arrangements in this specification or illustrate them in the drawings, it is only necessary to assume that in all cases where relays of electro-magnets would otherwise operate simultaneously the same by any of these arrangements are prevented from doing so.

Referring now to Figs. 1 and 2 which drawings together form a diagram of connections of an automatic exchange having a number of subscribers small enough to be connected to one single connector in which case no secondary connector between the switching circuits is necessary, a subscriber's station assumed to be calling is indicated at 1. As before mentioned I have in this example of an operative embodiment of my invention employed the customary step for step selecting system and for that purpose a subscriber's station is provided with a sending switch 2 which actuates a switch in the known manner so as to intermittently connect the one or the other side of the line to ground. I have assumed that this switching mechanism when turned the first time grounds the one side of the line and turned a second time grounds the other side of the line a number of times corresponding to the angle the disk is turned. The reversing arrangement for doing this has not been shown and can be of any suitable construction. The subscriber's station is connected to the exchange by means of a circuit 3 and 4 which ends in the terminals 5 and 6 of a connecting member of the first group of the connector. Said connecting member is indicated as an arm 7 pivotally mounted upon a shaft 8. All the arms of said first group are mounted upon the same shaft. Slidably mounted upon said arm is a rod 9 which carries the insulatedly mounted terminals 5 and 6. The arm is held in its inoperative position shown in the drawing by means of a latch 10 which latch can be released by an electro-magnet 11 and engages the pin 12 upon the arm. When said arm is released it falls turning around the shaft 8. The lower end of the rod 9 has a contact making spring 106 adapted to engage contact rods 49. The members of the second group of which only one member is shown in the drawing as this will suffice to explain the operation are indicated as arms 13 pivotally mounted at 14 and carrying an insulating block 15 which holds the terminals 16 and 17 connected to the incoming end of the switching circuit. These terminals are shown as rods which extend the whole way in front of the members of the first group so that any of these last named members can engage the rods. The arm 13 is held in its inoperative position by means of the spring 18. In this position a falling member of the first group will go clear of the rods. The member can, however, be brought into a position where it can be engaged by said members of the first group by means of an electro-magnet 19. When such a member is brought into said position the contacts 20 and 21 of a key 22 will be broken and the contacts 23 and 24 of the same key be closed. As will be seen later the object of this key is to disconnect the terminals 16 and 17 from the switching circuit and connect the same to the selector. The switching circuit is indicated at 25 and 26 and ends at the terminals 27 and 28 of a member of the third group seen in Fig. 2. The arm of said connecting member of the third group is marked 13′ and is of the same construction as the member 13 with the exception that it carries a third terminal 29 the object of which will be described later.

At Fig. 2 there is shown another member of the first group of terminals indicated by the arm 7′ carrying the rod 9′ locked by a latch 10′ that can be released by the electromagnet 11′. The arm is pivotally mounted upon the shaft 8 which is the same as that shown in Fig. 1 and the real position of said arm is, of course, above or below the arm 7 in Fig. 1. The terminals 5′ and 6′ are connected to the subscriber's station 1′ which of course is exactly similar to 1 in Fig. 1. The arm 13′ engages a key 22′ which operates in the same manner as the key 22, the object of this key is to disconnect the terminal 27 and 28 and connect the same to a source of ringing current when the arm is brought into its engaging position by means of the electro-magnet 30. The switching circuit 25 and 26 is perfectly equivalent to a cord circuit of a manually operated switchboard, the terminals carried by the member 13 correspond to the answering plug and the terminals carried by the arm 13′ correspond to the calling plug, the key 22 corresponds to the operator's listening key and the key 22′ corresponds to the ringing key. The system has been designed for common battery purpose and the cord circuit 25 and 26 has therefore been provided with means for supplying current to the subscriber's station for operating the transmitters of said station. These means could be of any suitable kind but I have here shown the well-known arrangement of supplying the current through retardation coils and separating the direct current path of the called and calling circuit by means of condensers.

The means for restoring the terminals of the first group have in the diagram merely been indicated by an electro-magnet 31. It is thought sufficient to state that said electro-magnet when operated causes a rod engaging the ends of the terminals to be restored to travel in a direction opposite that of the movement of said members.

The operation of the system is as follows: When subscriber 1 calls up he takes the telephone off the hook, this causes current to go from the battery 32 over the line 33, electro-magnet 11, lead 34, contact 35, lead 36 out on the one side 4 of the subscriber's line from there through the induction coil 36, the now closed hook contacts 37, the transmitter 38 and the normally closed contact 39, back to the line 3, lead 40, contact 41, lead 42 and the resistance 43 to ground and back to battery, energizing the electro-magnet 11 which releases the latch 10. The now free arm 7 will fall and the contact maker 106 will slide over the contact rods 49 until it comes to one which as that in the drawing is associated with an idle switching circuit. Now current will go from the battery over the lead 44, contact 45, lead 46, electro-magnet 30, lead 47, electro-magnet 19, lead 48, contacts 49 and 106 to ground and back to battery. This causes the electro-magnets 19 and 30 to swing the arms 13 and 13′ into such a position that they can be reached by a falling member of the first group. Now the arms 13 and 13′ and the contact rods 49 shall be so positioned that the arm 9 has passed the arm 13′ when this is brought down to the engaging position so that it engages the member carried by the arm 13. When the arm 7 fell contacts 35 and 41 are broken breaking away the current from the subscriber's line so that magnet 11 will cease to operate, the latch thus going back to its position of rest. Now the springs 5 and 6 make contact with the rods 16 and 17 which rods by means of the key contacts 23 and 24 and the leads 50 and 51 are connected through the operating magnets 52 and 53 to the battery. The sender hereinafter referred to is similar to but not the same in construction as the one described in applicant's Patent No. 927,469. Supposing now the subscriber operates his sender to select the number, which we will assume to be "81", opens the contact 39 and successively opens and closes switch 2 and contact 58, thus connecting line 4 eight times to ground through lead 54. Current will then go from the battery over the lead 55, electro-magnet 53, lead 51, contact 24, contacts 16 and 5, line 4, lead 54 and contact 58 to ground. The electro-magnet 53 will now operate the pawl 56 so as to raise the selector shaft and rack 57 eight times. Now the subscriber operates switch 2 once to open and close the contact 58' when contact will be made between ground and the line 3 once. Current then goes from battery over lead 55, electromagnet 52, lead 50, contact 23, contacts 17 and 6 to the other side 3 of the line and through contact 58' to ground, thus operating the pawl 59 on the magnet 52 so as to turn the shaft 57 one step which results in the sweepers 60 making contact with the terminals No. 81. When the shaft turns, the normally broken contact between the springs 61 and 62 is closed allowing current to go from battery over spring 61, springs 62, lead 63, the sluggish relay 64 and lead 65 to ground. This relay now closes slowly and closes at first the contacts 66 and 67. When these contacts close current goes from the ground side of the battery over the lead 65, contact 66, lead 68, the lower spring of the sweeper 60, the lower contact of the terminals No. 81, lead 69, electro-magnet 11' and lead 70 back to battery. Now this electro-magnet 11' operates to release the arm 7' of the selected subscriber. If this subscriber is busy, however, said arm is already released and the contact 71 accordingly closed. Current therefore goes from battery through lead 72, lead 73, common restoring relay 74, lead 75, contact 67, lead 76, upper spring of the sweeper 60, upper contact of the terminals number 81, lead 77, contact 71 and resistance 43' to ground. The disconnecting relay 74 is thus operated closing the contacts 78, 79 and 80, contact 79 closes the primary circuit of a busy signal 81, through lead 82, self-breaker 87, primary winding 84, lead 85, contact 79 and lead 86 so that the busy signal is started; the contact 80 closes the secondary circuit of said busy signal which then is connected through lead 83 to the line 50 and the one side 3 of subscriber's line and the other side through the lead 67, contact 80 and lead 88 to lead 51 and the other side 4 of subscriber's line. When disk 2 after the selecting operation goes back to its position of rest it closes the contact 39 thus connecting the subscriber's instrument to the line so that the subscriber is notified that subscriber number 81 is busy by means of the busy signal sound in his receiver and puts the same back on the hook. When the contact 78 of the disconnecting relay 74 was closed current goes over lead 72, the restoring motor 31, lead 89, contact 78 and lead 86 to ground and back to battery. The restoring motor now operates and restores the member 7 to its initial position of rest where it is locked by a latch 10. In the meantime the contact 90 of the sluggish relay 64 has closed and the current is thus sent out from the battery through lead 91, selector restoring magnet 92, lead 93, contacts 90 and 66 to ground and back to battery. The magnet 92 then operates its detent pawl 94 which releases the selector shaft and rack 57 which goes back to its original position of rest breaking the contact between springs 61 and 62 so that the current in the sluggish relay 64 is broken and the same ceases to operate breaking away the current from releasing magnet 11' and the common disconnecting relay 74 which both cease to operate.

When relay 74 ceases to operate the busy signal is disconnected and the current broken in the restoring motor 31 which goes back to its position of rest. When, however, the restoring motor restored the member 7 to its position of rest contact was broken between the rod 49 and the contact 106. The current in the electro-magnets 19 and 30 is thus broken away and the arms 13 and 13' go back to their positions of rest breaking away the selector from the switching circuit. Everything is now restored to the respective rest positions. If, however, the line No. 81 should happen to be idle the arm 9' would have been in its rest position and the contact 71 broken. When the selector therefore had selected the terminals No. 81 no current could have gone over the disconnecting relay 74 so that no busy signal would have been given. The magnet 11' would then have released the arm 7' which falls and allows the terminals 5', 6' and 95 to make contact with the rods 27, 28 and 29 respectively. When this contact is formed current will go from the ringing generator 96 over the lead 97, contact 98, lead 99, contacts 27 and 5' to the one side 4' of the subscriber's line and from there through the bell and the condenser back through the other side 3' of the line, contacts 6' and 28 and lead 100, and contact 101, lead 102, contact 103 of the disconnecting relay 104 and lead 105 back to the generator, thus signaling the subscriber. When contact is formed between the contacts 95 and 29 current goes from the battery over lead 107, relay 108, lead 109, contacts 29 and 95 to ground and back to battery. Relay 108 is thus operated breaking the contact 45 which breaks away the current from electro-magnets 30 and 19 causing the arms 13 and 13' to go back to their positions of rest, the return of arm 13' breaking the signal circuit, their terminals still being connected with the terminals of the two subscribers. This relay shall be sluggish so as to allow sufficient time for the signal. Everything is now ready for the conversation and current is supplied to the subscriber's station 1 through lead 110, retardation coil 111, lead 112 to the one side 26 of the calling subscriber's half of the switching circuit and back from the line 25 of said half through lead 113, supervisory relay 115 and lead 116 to the ground side of the battery, and to the called subscriber through lead 110, retardation coil 117, lead 118, to the one side 26' of the called subscriber's half of the switching circuit and back from the other side 25' through lead 119, supervisory relay 120 and lead 116. As soon as the switching circuit is connected for conversation the relay 115 will be energized as the calling subscriber has his receiver off the hook and the contact 121 on said relay is thus broken. As soon as the called subscriber takes the receiver off the hook at the station 1' the relay 120 will also become energized and the contact 122 on said relay will be broken. As soon as the sluggish relay 108 operates, the contact 123 on said relay is closed connecting the disconnecting relay 104 to battery at the one side. The other side is open at the contact 121 and will remain so until both subscribers have put their telephones on the respective hooks when relays 115 and 120 cease to operate closing the contacts 121 and 122, current will then go from battery over lead 44, contact 123, lead 124, relay 104, and lead 125, contact 121, contact 122 and leads 126 and 116 to ground and back to battery. The disconnecting relay thus operates, breaks the contact 103 and closes the contacts 127, 128 and 129. Current will then go from battery over lead 130, contact 127, lead 46, electro-magnet 30, lead 47, electro-magnet 19, lead 131, contact 128 and lead 132 to ground and back to battery energizing the electro-magnets 19 and 30. The arms 13 and 13' will thus be swung in so as to allow the terminals of arms 7 and 7' to be disconnected. The signaling circuit of the generator 96 is broken at the contact 103 so that the called subscriber does not receive any new signal. When contact 129 closed current also went from battery over lead 72, restoring motor 31, lead 133, contact 129 and lead 132 to ground so that the said motor operates so as to restore the terminals carried by arms 7 and 7' to their original position of rest. To avoid duplication of the drawing the motors 31 of Figs. 1 and 2 may be considered as operated by either the calling or called subscriber, as the connections are the same. During this restoring operation the contact will be broken between contacts 29 and 95 thus breaking away the current in relay 108 which slowly goes back to its position of rest breaking the contact 123 and closing the contact 125 again. When contact 123 is broken the relay 104 ceases to operate breaking its contacts 127, 128 and 129 and closing the contact 103. The current is thus cut away from the restoring motor 31 and the electro-magnets 19 and 30 so that the said motor and the arms 13 and 13' go back to their positions of rest and when the terminals of the arms 7 and 7' reach their original positions the contacts operated by the same connect the respective lines to the releasing magnets 11 and 11' and the resistances 43 and 43'. Everything is now restored to the initial rest positions.

As before mentioned, means are provided to prevent simultaneous operation of the terminals of several subscribers and means may be adapted when operated to prevent disconnecting a pair of subscribers having finished their conversation until the device is idle.

In Fig. 7 I have shown a very conventionalized diagram of the connectors and the talking circuits leading to and from the same for an exchange up to one thousand subscribers. For such an exchange I employ only one trunk connector represented in the diagram at A. Said trunk connector is adapted to make the connections between all the switching circuits of ten local connectors designated by B. Each local connector is adapted to connect 100 subscribers' lines which lines I have shown in ten tenpair cables shown at the upper end of the figure. Each connector has ten incoming switching circuits shown at C as a ten-pair cable. These incoming switching circuits are connected to the terminals of the first group of the trunk connector A, which group is indicated in the drawing by the upper half D of the circle. Each local connector has also ten outgoing switching circuits E connected to the second group of terminals of the trunk connector A indicated at F.

The way of connecting a subscriber with another will be easily understood from this diagram. Supposing a subscriber of the connector B' calls up, his line will then get connected with the first idle switching circuit of the cable C' which switching circuit in the manner described in connection with Figs. 1 and 2 connects itself to the selector of said trunk connector. The subscriber will now select the hundred to which the desired subscriber belongs and when this selection is done the connector will automatically make connection between the calling switching circuit and the first not busy switching circuit of the ten that lead to the local connector having said hundred number, which we may assume to be B''. Connection is thus formed between a switching circuit of the cable C'' and a switching circuit of the cable E''. Now this switching circuit connects itself with the selector of the connector B'' and when the subscriber has selected the desired ten and unit the corresponding connecting member which we may assume to be connected to a line of the cable G is released and makes contact with the switching circuit. Thus the complete talking circuit is formed.

The same principles used in the embodiment of my invention as now described for a small exchange may be applied to an exchange having any number of subscribers.

It will only be necessary to provide one or more connectors with associated selectors for making the connections between different switching circuits so that the subscriber can reach any other subscriber regardless of whether said subscriber is connected to the same local connector as the calling subscriber or not. In the embodiment of my invention illustrated in the remaining drawings, I have, however, applied a few other principles that have certain advantages in carrying out my invention for a large number of subscribers, one of these principles is that the local connector not only connects the subscriber's line to an idle switching circuit but to such an idle switching circuit which leads to a trunk connector which at the time is idle. This results in a greater speed of operation and on the other hand makes it possible to put one or more of said trunk connectors with associated means out of commission without disturbing the operation of the exchange.

In Figs. 8 and 9 I have shown the cabling of the talking circuits as the same would be in an exchange having up to ten thousand subscribers (fourth power of ten). Such an exchange would have one hundred local connectors and ten primary and ten secondary connectors, but for the sake of clearness I have in Fig. 8 abridged the number of local connectors to sixteen (the square of 4) and accordingly shown only four primary and four secondary trunk connectors. In Fig. 9 however, which represents the connections between the primary and the secondary connectors I have shown twenty trunk connectors but only connected a few of these completely in order to prevent confusion of the drawing. In said Fig. 8, B represents as before the local connectors, C their incoming switching circuits and E the outgoing switching circuits. H represents the primary connectors and J the secondary connectors. The function of the primary connector is to connect the incoming switching circuit with an intermediate switching circuit that leads to the selected hundred or secondary connector which function is to connect this intermediate switching circuit with an out going switching circuit leading to the local connector to which the desired subscriber is connected. The local connectors have, as the corresponding connectors in Fig. 7, ten incoming and ten outgoing switching circuits and are adapted to take hundred subscribers' lines. All the ten outgoing switching circuits E are connected to the same secondary connector J but the incoming switching circuits are for the reason stated above connected to different primary trunk connectors H. In Fig. 8 I have shown the incoming switching circuits of each local connector distributed over the total number of primary trunk connectors. This insures, of course, the best distributions of the calls, but this distribution may be carried out in a manner insuring good results for all practical purposes by distributing the incoming switching circuits among smaller number of primary connectors. In Fig. 9 I have shown the cabling of the intermediate switching circuits. The same is easily understood by a glance at the figure and it is not thought necessary to explain further than to state that from each primary connector H goes ten switching circuits represented as a ten-pair cable K to each secondary connector J. The forming of the talking connection between two subscribers is now easily understood from these diagrams. Supposing a subscriber connected to the local connector B' calls up. His connecting member will then make connections with the first not busy switching circuit C that leads to an idle primary connector H. Supposing H' is busy, the line C' will be inaccessible for the subscribers' terminals which instead will connect with the first idle line which may be assumed to be C'' which leads to the connector H''. The switching circuit as before described connects itself to the selector of said primary trunk connector H'' and the subscriber then selects the thousand of the number wanted. This selection being made the connector connects the incoming switching circuit to the first idle intermediate switching circuit leading to the connector of said thousand which we may assume to be J'. The selected intermediate switching circuit is then in the cable K' shown in Fig. 9. Now the selector of this secondary trunk connector J' comes into the operation and selects the hundred wanted that is the local connector to which the subscribers of said hundred are connected. We will assume this to be B''. The trunk connector connects the intermediate switching circuit of cable K' to the first not busy out-going switching circuit of the cable E' whereupon the local connector B'' connects the switching circuit with the selected subscriber in the manner before named.

It is now easily seen how a connection between any two subscribers of a telephone system of any number is to be built up. For a number of subscribers exceeding ten thousand but lower than one hundred thousand, it will, of course be necessary to introduce another trunk connector making connections between two intermediate switching circuits. As will be seen from the diagrams 3, 4, 5 and 6 which will be explained later, all the functions of the switching circuits may be performed through three conductors only of which two serve alternatively as the talking circuit and for operating the selector, and the third conductor is employed for facilitating the operation of the connectors.

It is thus easily seen that the different connectors need not to be installed in the same exchange but can be installed in different exchanges so that, for instance, each local connector with associated means may form a sub-exchange, each primary trunk connector may form a central exchange for ten such local connectors, each primary and each secondary trunk connector will form a trunking exchange and if a number of subscribers larger than ten thousand is involved the intermediate trunk connectors may constitute a master exchange. When my invention is carried out in this manner it will not be practical to distribute the incoming trunks over all the primary trunk connectors of the system as has been shown in Fig. 8 but good results can be obtained by distributing said switching circuits over a couple of primary connectors only. That the employment of the now mentioned sub- and master-exchange principle results in a great saving of lines and conduit is evident.

Before describing the diagrams Figs. 3, 4, 5 and 6 it will be necessary to describe a little detail of the arrangement of the trunk connectors. This detail is a device for releasing the first not busy terminal of a selected group and is shown in Figs. 10 and 11 of which 10 is a side elevation of the device partially in section and Fig. 11 a top plan view of the same also partially in section. In these figures 135 represents arms upon which a rod 136 carrying the terminals of the second group of the trunk connectors are mounted. These terminals are not shown in the drawing. The arms are pivotally mounted upon a shaft 137 and are adapted when released to fall in the direction of the arrow in Fig. 10, when the terminals make connection with the terminals of the first group. In Figs. 10 and 11 ten such arms are shown representing the terminals of one section of said group, that is, the section that is selected when the selector takes a position corresponding to a certain number. The arms are held in their normal position of rest by means of a latch 138 of peculiar shape engaging a member 139 common to all the connecting members. Each latch is provided with a projection 140 adapted to be engaged by a member 141 which is provided with successively rising projections 142. This member is slidably mounted upon an armature 143 of an electro-magnet 144 and extends by means of the spring 145 to move toward the connecting member. When all the members are in their initial positions only the uppermost projection 142$^A$ of said member 141 is in engagement with a latch, that is, latch 138$^A$. The armature 143 is pivoted at 146 so that when it is attracted by the electro-magnet 144 it will raise the member 141 which thus will release the latch 138$^A$ so that the member 135$^A$ will be released. The member 141 will during this operation slide out until the next projection 142$^B$ of the same rests against the edge of the projection 140$^B$ and when the current ceases to flow in the electro-magnet the armature and the thereto connected member 141 will descend to their lower position of rest where the member 141 will engage the latch 138$^B$ in the same manner as it before engaged 138$^A$. The next time the electro-magnet is energized the member 135$^B$ will thus release and so on. If now a released terminal such as 135$^A$ is restored again the edge 147 of its latch will push back the member 141 so that this member will be the next to be released and so on. Thus it is seen that when the selector puts current out on the electro-magnet belonging to the selected section, the first, not busy connecting member will always be released.

In the diagram Figs. 4, 5 and 6 which together form a diagram of a connection to be established between a calling and a called subscriber in a system having up to ten thousand subscribers, Fig. 3 shows the calling station and that part of the local connector which is used to connect the calling line with an incoming switching circuit. Fig. 4 shows that part of the primary trunk connector with associated means which is employed in establishing the connection between said incoming switching circuit and the selected intermediate switching circuit. Fig. 5 shows that part of the secondary trunk connector with the associated means which is employed for establishing the connection between said intermediate switching circuit and an outgoing switching circuit and Fig. 6 shows that part of the local connector with associated means which is employed for establishing the connection between said outgoing switching circuit and the selected subscriber's line and shows only the called subscriber's station to such an extent that is necessary for understanding the operation of said station when called. Omitting the diagram Fig. 5 the three remaining sheets form a diagram of a connection between two subscribers in a system having up to one thousand subscribers and adding one sheet of drawings exactly the same as Fig. 5 between Figs. 4 and 5 or 5 and 6 would give the complete diagram of a connection between two subscribers of a system having up to one hundred thousand subscribers. If the connecting devices are not placed in the same exchange, the same diagrams also represent sub-exchanges and central exchanges so that, for instance, Fig. 3 plus Fig. 6 make up the diagram of a sub-exchange and Figs. 4 and 5 make up the central exchange. The added sheet would in such a case be a diagram of the master exchanges. Notwithstanding the different ways in which the diagrams thus can be read together, it has been thought necessary only to explain one of these ways that is for establishing a connection between two subscribers in a system having more than one thousand and less than ten thousand subscribers.

Referring now to Fig. 3 a subscriber's station 148 consists of an ordinary common battery telephone instrument having bell, condenser, induction coil, receiver and transmitter. The receiver and transmitter I have shown as a combination set (micro-telephone) at 149. The instrument is equipped with an automatic sender 150 the function of which is to send the impulses necessary for operating the selector at the central station in right succession and an indicator switch 151 for predetermining the impulses to be sent. The impulses as I have before mentioned are sent by making different connections between the two line wires 152 and 153 and ground. The impulses are the following: 1:—Line wire 152 through condenser and resistance to ground; line wire 153 through condenser and resistance to ground. 2:—Line wire 152 through condenser and resistance to ground. 3:—Line wire 153 through condenser and resistance to line wire 152. 4:—Line wire 153 through condenser and resistance to ground. 5:—Line wire 152 through resistance to line wire 153 and same line wire through condenser and ground. 5:—Line wire 153 through resistance to ground and line wire 152 through condenser to ground. 7:—Line wire 152 through resistance to ground. 8:—Line wire 153 through resistance to line wire 152. 9:—Line wire 153 through resistance to ground. 10:—Line wire 152 through resistance to ground and line wire 153 through condenser to ground. These circuits can be traced from the contacts of the indicator switch 151. The resistance mentioned is the electro-magnet 154 whose function will be described later. The switch 151 has as many sets of brushes 155 as there are digits in the number to be selected although I have in order to prevent confusion of the drawing shown only one set in Fig. 3. These sets of brushes are so arranged that they can take any of the positions possible, simultaneously. These brushes lead to contact plates 156 of the sender switch 150. There are three rows of such contact plates left unconnected in the drawing and these are adapted to be connected with the three other sets of brushes 155 which are not shown in the drawing. On the segments 156, contacts 157, 158 and 159 are adapted to ride. These contacts are connected to the line and to the ground and are in the drawings shown mounted upon a slidable toothed member 160 connected to the switch hook 161. When the telephone is on the hook the switch takes the lower position shown in the drawing but when the telephone is taken off the switch is raised by means of the spring 162 until it is arrested by the detent pawl 163 operated by the armature 164 of the electro-magnet 154. When this happens the receiver induction coil is connected to the line and the electro-magnet 154 shunts the induction coil.

The line 152, 153 ends in the terminals $5^A$ and $6^A$ of a connecting member at the primary connector. This member is indicated as an arm $7^A$ pivoted on a shaft $8^A$ and having a slidably mounted rod $9^A$ to which the said terminals are insulatedly attached. It has also another terminal $95^A$ which is in direct electrical connection with the rod. The line is normally supplied with current from the battery 32 over the bus-bar 166, lead 171, right side winding of relay 168, lead 170, contact $35^A$ to the one side 153 of said line and through bus-bar 165, lead 167, left side winding of the relay 168, lead 169, and contact $41^A$ to the other side 152 of the line so that when the subscriber at station 148 takes the telephone off the hook the switch will rise one step and then as current will go through the magnet 154 the pawl 163 will engage the rack 160 with its lower end. It is evident that when the current is broken at the exchange the pawl 163 will release the rack 160 one step so that the brushes 157, 158 and 159 will advance to their third position.

The members $7^A$ of which I have assumed one hundred to be assembled in one connector, are held in their initial position of rest by the latches 180 which engage the member 181. Each member is released by the coöperation of the two electro-magnets 174 and 179. There are ten magnets 174 and ten magnets 179 corresponding to tens and units, respectively, and the release of a certain member for instance that shown in the drawing is performed by the coöperation of a certain ten magnet with a certain unit magnet, for instance, supposing the last two digits of the calling subscriber's number are 2 and 3, then the member $7^A$ would be released by the coöperation of the ten magnet No. 2 and the unit magnet No. 3. This coöperation principle is made use of in my Patents Nos. 1,061,650 and 1,061,651.

When the subscriber 148 calls up as before said, the switch 150 will take its second position and current will go from battery 32, bus bar 166, lead 171, line relay 168, lead 170, contact $35^A$, the one side 153 of the subscriber's line brush 159, corresponding contact 156, lead 301, the transmitter, the induction coil 302, lead 305, to the contact 156 corresponding to brush 157 and back through the other side 152 of the line, contact $41^A$, lead 169, right hand winding of relay 168, lead 167 and bus bar 165 to the other side of the battery. Thus relay 168 is operated closing the contacts 172 and 177 so that the current goes from lead 171 to contact 172 lead 173 and ten-magnet 174 to ground. This magnet now operates its armature 175 causing the armature 176 to be moved to an engaging position with relation to the latch 180. Current also goes from lead 171 over contact 177, lead 178 and unit-magnet 179 to ground causing the armature 176 to release the latch 180. Thus the arm 7$^A$ is released and falls in the direction of the arrow causing the contacts 41$^A$ and 35$^A$ to be broken thus cutting out the line relay so that the contacts 172 and 177 are broken and the releasing parts go back to their position of rest and the current is cut off from the subscriber's instrument which causes the switch 150 to advance to the third position, where the brushes 157, 158 and 159 are connected to a set of brushes 155 which previous to the call has been set for position corresponding to the thousand figure of the wanted subscriber's number. The substation is now ready for the first step of the selecting operation.

The contact member 106$^A$ of the falling arm 7$^A$ slides over contacts 49$^A$ until it reaches a contact which like that of the drawing belongs to an incoming switching circuit which is not busy at the time and which leads to a thousand connector governed by a selector which is not busy at the time. Current will now go from the battery 32 over lead 182 (see Fig. 4.) lead 183, contact 184 of the relay 216 common to the thousand selector, lead 185, relay 186, contact 187, contact 188, of the relay 236, third conductor 189 of the switching circuit, relay 190 at the primary connector, lead 192, contact 191, lead 193, magnet 19$^A$, lead 194, contacts 49$^A$ and 106$^A$ to ground. The mentioned relay 190 is a very sluggish one and has a very low resistance compared with the electro-magnet 19$^A$ and the relay 186 of the thousand connector so that the same will not operate during the operation now to be described. The electro-magnet 19$^A$ of the primary connector and the relay 186 of the thousand connector now operate, the electro-magnet 19$^A$ causing the contact member 13$^A$ to be brought into the position where it can be engaged by the member 7$^A$. The contacts 5$^A$ and 6$^A$ now engage the contacts 16$^A$ and 17$^A$ and the contact 95$^A$ engages the contact 202$^A$. Thus the electro-magnet 19$^A$ is short-circuited by the contacts 95$^A$ and 202$^A$ and lead 203. The arm 13$^A$ thus goes back to its original position carrying the now connected contacts 5$^A$ and 6$^A$ with it so that connection now is established between the subscriber's line 152—153 and the incoming switching circuit 204 and 205. Simultaneously with this relay 186 of the said switching circuit at the thousand connector has been operated closing the contact 208 so that the current goes from battery over the lead 206, electro-magnet 19$^B$, lead 207, contact 208, locking winding 209, contact 210 on relay 236 to ground and back to battery. Thus the electro-magnet 19$^B$ causes the connecting member 13$^B$ to be moved into such a position that it can be reached by a falling member 135$^B$. The movements of this member caused the contacts 211, 212 and 213 to be closed so that the current goes from battery over lead 182, lead 214, contact 211, lead 215 and relay 216 to ground. This relay now operates breaking the contacts 184 thus cutting away the current from all the leads 185 so that the current in operating winding of relay 186 and the current in the sluggish relay 190 ceases to flow. The whole operation described since it was mentioned current went through relay 190 has taken such short a time that said relay 190 has not been operated. The contact 184 is common to all the leads 185 of all the incoming switching circuits that are connected to this thousand connector so that no connection can be made with any of said switching circuits during the time the relay 216 is operated, that is, as long as the connector is busy.

When contacts 212—213 closed the connection is formed between the switching circuits 204—205 through leads 217—218 and the said contacts to leads 219—220 which are connected to the four relays 221, 222, 223 and 224 of the selecting device. On the other end the relay 221 is connected through lead 225 to the bus bar 165 of the battery. Relay 222 is connected through lead 226 to the other bus bar 166 of said battery and the relays 223—224 are both through lead 229 connected to the one side of a alternating current generator 230 which other side is grounded. Between the other end of the relay winding 223 and lead 219 a condenser 227 is inserted and another condenser 228 is inserted between relay winding 224 and lead 220 so as to prevent battery current from being closed through these relays. Any suitable means, such as inductance or choke coils, may be employed for preventing the alternating current from being closed through the direct current relays 221 and 222. The four relays are adapted to coöperate so as to swing a contact member 231 into engagement with one or the other of the contacts 232, the position of said member being dependent upon the number of said relays operated at the same time and this is of course dependent upon the connection between the line wires 152 and 153 and ground made by the indicator switch set at the substation 148. A selecting device is fully described in my Patent No. 979,404. Assuming now that the switch has been set to the position No. 9 the selector relays will coöperate to bring the contact member 231 into engagement with the contact No. 9 selecting the 9th group of intermediate switching circuits. Current will now go from battery over the lead 234, releasing electro-magnet 144$^B$ of said group, lead 233, contact 232 No. 9 and contact member 231 to ground. The electro-magnet 144 will now by means of its armatures 143$^B$ and associated parts, in a way described in connection with Figs. 10 and 11, release the member 135$^B$ connected to the first not busy switching circuit of this group. The arm 13$^B$ will now fall causing the contacts 5$^B$ and 6$^B$ and 95$^B$ to make contact with the contacts 16$^B$, 17$^B$ and 202$^B$ respectively. Current now goes from battery over lead 235, relay winding 236, lead 237, relay 238, lead 239, contact 202$^B$, contact 95$^B$, third conductor 240, of the intermediate switching circuit, contact 241 of relay 248, lead 242, electro-magnet 243, and lead 244 back to the other side 166 of the battery. The electro-magnet 19$^C$ (243) and relays 238 and 236 now operate, contacts 188 and 210 on relay 236 break and all the contacts on relay 238 break. When relay 236 operates, contact 248 is closed and current goes from battery over lead 182, lead 183, contact 245, lead 246, locking winding 247 of relay 236, and contact 248 of said relay to ground, thus locking this relay. When the contact 210 opens, the current in the locking winding 209 of relay 186 ceases to flow so that the contact 208 that has been closed until now is opened, the current in electro-magnet 19$^B$ thus ceases to flow and the arm 13$^B$ goes back to its original position, the contacts 16$^B$ and 17$^B$ carrying with them connecting member attached to arm 135$^B$. When the arm 13$^B$ goes back to its position of rest the contacts 211, 212—213 are opened again disconnecting the selector from the switching circuit 204—205 and cutting off the current from the "connector busy" relay 216 so that contact 184 is closed again allowing a subsequently calling line to be connected to a switching circuit of the now idle thousand connector. No connection can, however, be formed with the busy incoming switching circuit 204—205 as the contact 188 is open at relay 236 so that when the contact member 106 of a subsequently calling line slides over the contact rod 49$^A$ and the member 13$^A$ of the busy switching circuit will not respond. When the selector was cut off from the selected circuit the current in the electro-magnet 154 ceased to flow and the switch 150 advances to its fourth position so that the station 148 is ready to select the hundred.

As before mentioned the electro-magnet 19$^C$ of the switching circuit 249—250 at the hundred connector operates at the same time as relay 236. This causes the arm 13$^C$ to be brought into its engaging position closing the contacts 212$^A$ and 213$^A$ which causes a second selector having the selecting relays 221$^A$, 222$^A$, 223$^A$ and 224$^A$ to be connected to the switching circuit. This selector now operates in the same manner as the thousand selector to select the hundred which we may assume to be the No. 7 and current flowing from battery over lead 234$^A$, electro-magnet 144$^C$, lead 233$^A$ contact No. 7 and member 231$^A$ to ground causes the arm 135$^C$ of the first not busy outgoing switching circuit 254—255 to be released so that the contacts 5$^C$, 6$^C$ and 95$^C$ engage contacts 16$^C$, 17$^C$ and 20$^C$ permitting current to flow from lead 240 over relay winding 248, lead 247, relay 246, lead 245, contacts 202$^C$ and 95$^C$, third conductor 256 of the outgoing switching circuit, contact 257, and electro-magnet 19$^D$ to ground. Thus relays 248 and 246 operate. Contact 241 on relay 248 now breaks so that the current in the electro-magnet 19$^C$ ceases to flow and the arm 13$^C$ goes back to position of rest with the switching circuit 249 and 250 still connected to the switching circuit 254—255 and causes the contacts 212$^A$ and 213$^A$ to open, cutting away the selecting device from the switching circuit. Thus the current in the electro-magnet 154 at the calling station is again broken and the switch 150 advances to its fifth position ready to select the ten of the wanted subscriber's number when the relay 248 operated, the contact 252 closed, permitting current to go from the battery over leads 249$^A$ and 249', contact 250, lead 251, contact 252, and locking winding 253 of the relay 248 to ground and back to battery, locking said relay.

As before mentioned the electro-magnet 19$^D$ operated simultaneously with relays 246 and 248, causing the arm 13$^D$ to be brought into its engaging position. Said arm belongs to primary connector to which the wanted subscriber is connected. The movement of said arm causes the key 280 to be shifted so that, among others, contacts 13$^B$ and 212$^B$ are closed. This causes the selector having relays 221$^B$, 222$^B$, 223$^B$ and 224$^B$ connected to leads 219$^B$ and 220$^B$ to be connected through contacts 258 and 259, leads 219$^C$ and 220$^C$ and contacts 213$^B$ and 212$^B$ to the switching circuit 254 and 255. Said selector is adapted to select both tens and units and has therefore double contacts. It is associated with a peculiarly arranged relay 260 which function is to make the connections necessary for allowing the first impulse of the selecting device to select the tens and next impulse to select the units, to break the contacts 258 and 259 so as to advance the switch 150 at the calling station when the tens are selected and also to make a connection used for busy test. When the selector is connected to the switching circuit by the action of the key 280 it sets itself to the position corresponding to the ten of the subscriber's number which we may assume to be No. 1 and current now goes from battery over lead 281, contact 265, winding 263 of ten-magnet 174$^D$, lead 261, contact No. 1 and member 231$^B$ to ground. The ten-magnet 174$^D$ thus operates its armature 175$^D$ putting the armature 176$^D$ in engaging position with relation to the latch 180 and closing the contact 268. Current now goes from battery over lead 266, relay 260, lead 267, contact 268, locking winding of magnet 174$^D$, lead 269 and contact 270 to ground and back to battery, locking the magnet 174 and causing the relay 260 to operate. This relay is comparatively sluggish. When the relay armature begins to move the contacts 259 and 258 will break on account of the stud on spring 272 coming into the recess of the cam disk 271 so that the selector is disconnected from the trunk line and the electro-magnet 154 of the calling station advances the switch 150 to its sixth position ready to select the unit of the wanted subscriber's number. The pin 273 upon the member 278 upon the armature of the relay 260 leaves the pin 275 and when the pin 274 reaches the pin 275 the cam disk 276 will be turned so that the stud on spring 279 comes into the recess of said cam disk breaking the contact 265 that connects the ten-magnets to the battery. When this is done the spring 272 is raised on account of the stud descending from the recess of the cam disk 271 so that the contacts 258—259 are closed again once more connecting the selector to the line. The selector now sets itself to contact No. 3 to which the unit brushes of the sender at the calling station are set and current therefore goes from battery over lead 281, contact 277, lead 282, unit-magnet 179$^D$, lead 283, contact No. 3 of the selecting device and the contact maker 231$^B$ to ground and back to battery. The projection 284 of the armature 176$^D$ is now in engaging position with relation to the stud 285 controlling the contact 270 so that when the armature 176$^D$ releases the latch 180$^D$ of the subscriber to be called said contact 270 is broken causing the current that energized the locking winding of the ten-magnet and the relay 260 to cease to flow. If the thus selected subscriber is not busy the arm 7$^D$ will be found in its initial position as indicated in the drawing and would have been released by the action described. The relay 260 now slowly goes back to its position of rest thus again breaking the contacts 258—259 which disconnects the selector from the line causing the switch 150 of the calling station to advance to its last position where the telephone instrument is connected to the line. In the meantime the arm 7$^D$ falls and causes contacts 5$^D$, 6$^D$ and 95$^D$ to make contact with the rods 16$^D$, 17$^D$ and 202$^D$. As before mentioned the key 280 is thrown so that the contacts 286—287 are closed. The current therefore goes from the signaling generator 96$^D$ over lead 288, contact 286, the one side 255' of the subscriber's half of the switching circuit, contacts 17$^D$ and 6$^D$, the one side 152$^D$ of the subscriber's line to the subscriber's instrument 148$^D$, through the bell and the condenser back to the other side 153$^D$ of the subscriber's line and from there through contacts 5$^D$ and 16$^D$, the other side 254' of the subscriber's half of the switching circuit, contact 287 and lead 289 back to the generator. Thus the subscriber receives a signal as long as the switch 280 is thrown. When contact 95$^D$ made connection with contact 202$^D$ a current goes from lead 256 over the relay 290, lead 291, contacts 202$^D$ and 95$^D$ to ground. This relay 290, is sluggish so as to allow sufficient time for the signals, but when it operates contact 257 is broken cutting off the current from the electro-magnet 19$^D$ so that the arms 13$^D$ with its contacts connected to the terminals of the called subscriber's line goes back to its initial position where the contacts 213$^B$ and 212$^B$ are open so that the selector is disconnected from the switching circuit and where contacts 286 and 287 are also broken so that the calling signal ceases. The connection between the calling and the called subscriber is now completed. The switching circuit 254—255 is through the contacts 292 and 293 and the condensers 294 and 295 connected to the other half of the switching circuit 254'—255' and current is now supplied to the calling subscriber's station from the one side 165 of the battery through lead 296, relay 297, lead 298 and contact 292 to the one side 254 of the switching circuit and from the other side 166 of the battery through relay 299, lead 300, contact 293, to the other side 255 of the switching circuit, and to the called subscriber's station from the one side 165 of the battery through retardation coil 301, lead 302, contact 303 to the one side 254' of the switching circuit and from the other side 166 of the battery through the retardation coil 304, lead 305, contact 306 to the other side 255' of the switching circuit. When the called subscriber takes his telephone off the hook, the switch 150$^D$ will connect the telephone instrument to the line and the conversation can now go on. As soon as the relays 299 and 297 become connected to the switching circuit 254—255 through the action of the key 280 the same will be energized and open the contacts 320 and 321 which will be open during the conversation.

I have now described what happened if the selected subscriber was not busy, if however, said subscriber should happen to be busy the arm 7$^D$ would not have been in its original position and could therefore not be connected to the calling subscriber's circuit when the selection was performed.

Arrangements are now provided to indicate to the calling subscriber that the line is busy and these arrangements operate in the following manner: When the selection has taken place, the current in relay 260 became broken as before described and the armature of said relay goes slowly back to its position of rest. The member 278 of said armature has a brush 312 mounted upon a roller 313 pivotally attached to said member. The outer surface of said roller is insulated and presses lightly against a segment 311 so that it can either slide or roll upon the same. When the relay moves away from its original position, the roller will roll upon the segment moving the brush away from said segment. When, however, the armature goes back to its position of rest, the roller will roll the opposite way until its movement is arrested by the brush 312 coming in contact with the segment 311. Now it will slide upon the segment and current goes from the lead 256 over the relay 290, lead 291, contact 307, lead 308, busy test relay 309, lead 310, segment 311 and brush 312, through the roller 313 to the member 278 of the armature of relay 260 to ground. This circuit is of course formed regardless of whether the subscriber is busy or not, but as before mentioned if the subscriber is not busy the terminal 95$^B$ has at this time made contact with rod 202$^B$ so that the current goes from lead 291 directly to ground and cannot operate the relay 309. When the subscriber, as now assumed, is busy said relay 309 will operate closing the contact 315 which closes the local circuit of a busy signal 316 so that said busy signal begins to operate and also closing the two contacts 317 which connect the secondary winding of said busy signal through leads 318 and 319 to the selector leads 219$^C$ and 220$^C$ which are connected to the switching circuit 254 and 255 through the key 280. Thus the subscriber is notified that the line is busy and puts his telephone back on the hook. The current that operated the relay 309 also went through relay 290 operating the same so that said sluggish relay operates so that the contact 257 breaks, cutting away the current from the electro-magnet 19$^D$ so that the arm 13$^D$ goes back to its position of rest. In the meantime the relay of the armature 246 has gone back to its position of rest where the brush 312 has left the segment 311 and rests against the insulated extension 314 of said segment. This breaks the current in relays 309 and 290 which therefore go back to their position of rest, the relay 290 very slowly, so that the current flowing through line 256 is broken. This means, as will be seen later, signal of disconnection, which disconnection operates in the following manner regardless of whether the same takes place on account of the called line being busy or the conversation being ceased and the subscribers therefore have put their telephones back on the hooks. The relays 299 and 297 have in the one or in the other manner become deënergized and contacts 320 and 321 have closed and the relay 290 is still energized. Current now goes from the battery over the lead 296 and the restoring electro-magnet 31$^D$, contact 323, contact 320 to ground. Thus the restoring electro-magnet begins to operate. In the meantime current goes from the battery 32, the contact 321, contact 322, electro-magnet 19$^D$ to ground so that the arm 13$^D$ takes its inner position and the restoring electro-magnet restores the member 7$^D$ to its position of rest. When contact 95$^D$ leaves contact 202$^D$, or as beforesaid, in the case of a busy line, when the brush 312 leaves the segment 311 the current in relay 290 ceases to flow and this relay slowly goes back to its position of rest breaking the contacts 322—323 so that the restoring magnet goes back to its position of rest and the arm 13$^D$ goes back to its original position and current no longer flows in the relays 246 and 238 (see Figs. 4 and 5). The contacts 324, 325 and 326 of said relay 246 (which have been open up to this time) and the contacts 333, 334 and 335 of relay 238 therefore close. These relays are now short circuited, relay 238 through lead 340, contact 335, lead 339 and contact 338, and relay 246 through contacts 324, lead 327 and contact 328 so that when contact 257 closes when relay 290 reaches its original position, said relays will not become energized again. Referring now to Fig. 5 current goes from battery over lead 244, electro-magnet 19$^C$, lead 242, contacts 325, lead 331, contact 332, lead 330, contact 326, lead 329, restoring magnet 31$^C$ and lead 249 back to battery. Thus the arm 13$^C$ is moved to its inner position and the magnet 31$^C$ restores the member 13$^C$ to its initial position. When magnet 31$^C$ reaches its farthest position the member 349 upon the armature will engage the stud 350 and break the contact 250. This breaks the current in the locking winding 253 of the relay 248 so that said relay goes back to its position of rest breaking the contacts 252 and 332 and 328 which breaks the current in magnet 19$^C$ and the restoring motor which goes back to its position of rest as does the arm 13$^C$. In the meantime current goes from the battery over lead 206 (see Fig. 4) magnet 19$^B$, lead 342, contacts 334 and 337, lead 189, sluggish relay 190 (see Fig. 3) lead 203, contacts 202$^A$ and 95$^A$ to ground and back to battery, thus the electro-magnet 19$^B$ operates and the arm 13$^B$ takes its inner position and the sluggish relay 190 begins to operate. Current also goes from battery over lead 182 (see Fig. 4) restoring motor $31^B$, contact 333, lead 343, contact 336 to ground and back to battery so that the restoring motor restores the member $135^B$ to its initial position and when it reaches its farthest position breaks the contact 245 so that the current in the locking winding 247 of the relay 236 ceases to flow and said relay goes back to its position of rest breaking its contacts 338, 337, 248 and 336. In the meantime the relay 190 at the local connector has closed its contacts 196, 197 and 195, so that current goes from battery over lead 198, contact 195, lead 193, electro-magnet $19^A$, lead 199 and contacts 196 and 197 to ground and the arm $13^A$ thus is brought to its inner position. Current also goes from battery over lead 200, restoring motor $31^A$, lead 201, contacts 196 and 197 to ground, so that the restoring motor restores the member $7^A$ to its initial position.

When the current in relay 190 ceases to flow on account of the contact between $6^A$ and $202^A$ being broken said relay goes back to its position of rest breaking the current in the restoring motor $19^A$ so that said motor and the arm $13^A$ go back to their respective rest positions. Everything is now restored to the initial positions of rest.

I have now described the operation of an embodiment of my invention as far as connection and disconnection are concerned.

It is not thought necessary to describe the operation of the sub-exchange system more particularly as the same will operate in exactly the same manner as a system where all the connecting and selecting devices are assembled in one exchange.

As many changes could be made in the above construction and many apparently widely different embodiments of my invention designed without departing from the scope thereof, I intend that all matter contained in the above description or shown in the accompanying drawings shall be interpreted as illustrative merely of an operative embodiment of my invention and not in a limiting sense.

What I claim is:

1. In an electro-mechanical exchange system, the combination of a number of circuits of which any one is adapted to be connected to any other, two groups of switching circuits, one incoming and one outgoing, of which any ingoing switching circuit is adapted to be connected with any outgoing switching circuit, automatically operated means adapted to connect the calling circuit to an incoming switching circuit, selectively operated means for determining the circuit to be called common to a number of switching circuits of said group, automatically operated means adapted to connect the incoming switching circuit with the determined outgoing switch-circuit and the said outgoing switching circuit with the so determined circuit to be called.

2. In an electro-mechanical exchange system, the combination of a number of circuits of which any one is adapted to be connected to any other, a number of groups of switching circuits, said groups being incoming, intermediate and outgoing groups, automatically operated means adapted to connect a calling circuit with a switching circuit of the incoming group, selectively operated means common to a number of switching circuits adapted to determine the intermediate and outgoing switching circuits and the circuit to be called and automatically operated means adapted to connect the incoming switching circuit with the so determined intermediate switching circuit, said intermediate switching circuit with the so determined outgoing switching circuit and said outgoing switching circuit with the so determined circuit to be called.

3. In an electro-mechanical exchange system, the combination of a plurality of local circuits adapted to be connected with each other through switching circuits, a number of switching circuits adapted to be controlled by the action of selective means, selective means for controlling said switching circuits common to a number of said circuits, means adapted to indicate any one of said switching circuits busy when the selective means that controls said circuit is busy, and means adapted to automatically connect a local circuit with a switching circuit that is not indicated busy.

4. In an electro-mechanical exchange system, the combination of a group of circuits, each circuit adapted to be connected with another circuit through a switching circuit, a switching device for said group of circuits, a group of terminals within said switching device to which said circuits are connected, another group of terminals connected to switching circuits leading to terminals of a switching device common to a number of said switching circuits, a common switching device, a group of such switching circuits, and means adapted to cause the terminals of one of said first named circuits to engage the terminals of one of said switching circuits.

5. In an electro-mechanical exchange system, the combination of a group of circuits, each circuit adapted to be connected with another circuit through a switching circuit, a switching device for said group of circuits, a group of terminals within said switching device to which said circuits are connected, a group of switching circuits, another group of terminals connected to said switching circuits leading to terminals of a switching device common to a number of said switching circuits, a common switching device, means adapted to indicate any one of said switching circuits busy when engaged by a circuit of the first named group, and means adapted to cause the terminals of one of the circuits of said group to engage and make contact with a switching circuit that is not indicated busy.

6. In an electro-mechanical exchange system, the combination of a group of circuits, each circuit adapted to be connected with another circuit through a switching circuit, a switching device for said group of circuits, a group of terminals within said switching device to which said circuits are connected, a group of switching circuits, another group of terminals connected to said switching circuits leading to terminals of a switching device common to a number of said switching circuits, a common switching device, means for rendering the terminals of said switching circuits inaccessible to the terminals of said first group of circuits, and means adapted to cause the terminals of one of the circuits of the first named group to make contact with the terminals of a switching circuit.

7. In an electro-mechanical exchange system, the combination of a group of circuits, each circuit adapted to be connected with another circuit through a switching circuit, a switching device for said group of circuits, a group of terminals within the said switching device to which said circuits are connected, two groups of such switching circuits, another switching device adapted to connect a circuit of the first group with a circuit of the other group, means adapted to cause the terminals of one of the switching circuits to make contact with one of the first mentioned circuits, means adapted to cause the so connected switching circuits to connect with a switching circuit of the second group, a selecting device common to each switching device and adapted to determine the connection to be made by said switching device, means for connecting said selecting device with one of said circuits when the connection to be made by said circuits shall be determined, and means for disconnecting said selecting device when said connection is determined.

8. In an electro-mechanical exchange system, the combination of a group of circuits each circuit adapted to be connected with another circuit through a switching circuit, a sender in each of the said first named circuits adapted to operate a selecting device, a switching device for said group of circuits, a group of terminals within said switching device to which said circuits are connected, two groups of such switching circuits, another switching device adapted to connect a switching circuit of the first group with a circuit of the other group, means adapted to cause the terminals of one of the switching circuits to make contact with one of the first mentioned circuits, means adapted to cause the so connected switching circuit to connect with a switching circuit of the second group, and a selecting device common to each switching device and adapted to determine the connection to be made by said switching device.

9. In an electro-mechanical exchange system, the combination of a group of circuits each circuit adapted to be connected with another circuit through a switching circuit, a sender included in said first named circuits and adapted to be set to the number of the circuits with which connection is wanted, a detent for said sender adapted when released to change the combination set on said sender to that corresponding to the number of the next digit of said circuit number, means for operating said detent from the exchange, a switching device for said group of circuits, a group of terminals within said switching device to which said circuits are connected, two groups of such switching circuits, another switching device adapted to connect a switching circuit of the first group with a circuit of the other group, means adapted to cause the terminals of one of the switching circuits to make contact with one of the first mentioned circuits, means adapted to cause the so connected switching circuit to connect with a switching circuit of the second group, and a selecting device common to each switching device and adapted to determine the connection to be made by said switching device.

10. In an electro-mechanical exchange system, the combination of a group of plural conductor circuits, each circuit adapted to be connected with another circuit, a plurality of such other circuits, a switching device adapted to make such connection, a selecting device adapted to determine the connection to be made by said switching device, contacts upon said selecting device corresponding to the numbers of one digit, and means operative by current transmitted at the same time over the conductors of said group of circuits and a return to cause any one of said contacts to be engaged.

11. In an electro-mechanical exchange system, the combination of a group of plural conductor circuits, each circuit adapted to be connected with another circuit, a plurality of such other circuits, a switching device adapted to make such connection, a selecting device adapted to determine the connection to be made by said switching device, contacts upon said selecting device corresponding to the numbers of one digit, and means operative by currents super-imposed upon one another and transmitted over the conductors of said circuit and a return to cause any one of said contacts to be engaged.

12. In an electro-mechanical exchange system, the combination of a group of plural conductor circuits, each circuit adapted to be connected with another circuit, a plurality of such other circuits, a switching device adapted to make such connection, a selecting device adapted to determine the connection to be made by said switching device, contacts upon said selecting devices corresponding to the numbers of one digit, and means operative by alternating currents superimposed upon direct currents transmitted over the conductors of said circuit and a return to selectively cause one of said contacts to be engaged.

13. In an electro-mechanical exchange system, the combination of a group of plural conductor circuits, each circuit adapted to be connected with another circuit, a plurality of such other circuits, a switching device adapted to make such connection, a selecting device adapted to determine the connection to be made by said switching device, contacts upon said selecting device corresponding to the numbers of one digit, means operative by alternating currents superimposed upon direct currents transmitted over the conductors of said circuit and the return to selectively cause one of said contacts to be engaged, and a sending device in each of said first named circuits adapted to make connections between the conductors of said circuit and the return corresponding to the impulse to be sent.

14. In an electro-mechanical exchange system, the combination of a group of plural conductor circuits, each circuit adapted to be connected with another circuit, a plurality of such other circuits, a switching device adapted to make such connection, a selecting device adapted to determine the connection to be made by said switching device, contacts upon said selecting device corresponding to the numbers of one digit, means operative by alternating currents superimposed upon direct currents transmitted over the conductors of said circuit and the return to selectively cause one of said contacts to be engaged and a sending device in each of said first named circuits having an indicator switch adapted to predetermine the connections to be made by the sender, and another switch adapted to make these connections in a succession corresponding to the digits of said number.

Signed at New York city, in the county of New York and State of New York, this 30th day of July, A. D. 1907.

FRANS GUNNAR AGRELL.

Witnesses:
LEWIS J. DOOLITTLE,
H. W. FORSYTH.